US008086524B1

(12) United States Patent
Craig et al.

(10) Patent No.: US 8,086,524 B1
(45) Date of Patent: Dec. 27, 2011

(54) SYSTEMS AND METHODS FOR TRANSACTION PROCESSING AND BALANCE TRANSFER PROCESSING

(76) Inventors: Patrick James Craig, New York, NY (US); Konrad Simeon Feldman, San Francisco, CA (US); Leonard Justin Laufer, Scarsdale, NY (US); Michael Heller, New York, NY (US); Paul Sutter, San Francisco, CA (US); Nikolas Alexander Sulkowski, New Canaan, CT (US)

( * ) Notice: Subject to any disclaimer, the term of this patent is extended or adjusted under 35 U.S.C. 154(b) by 718 days.

(21) Appl. No.: 11/852,772

(22) Filed: Sep. 10, 2007

(51) Int. Cl.
*G06Q 40/00* (2006.01)
(52) U.S. Cl. ............................................. 705/38; 705/39
(58) Field of Classification Search .................... 705/35, 705/14, 38
See application file for complete search history.

(56) References Cited

U.S. PATENT DOCUMENTS

| 5,621,201 | A | 4/1997 | Langhans et al. |
| 5,819,226 | A | 10/1998 | Gopinathan et al. |
| 5,870,721 | A | 2/1999 | Norris |
| 5,878,403 | A | 3/1999 | DeFrancesco et al. |
| 5,991,750 | A | 11/1999 | Watson |
| 6,029,149 | A | 2/2000 | Dykstra et al. |
| 6,029,154 | A | 2/2000 | Pettitt |
| 6,119,103 | A | 9/2000 | Basch et al. |
| 6,330,546 | B1 | 12/2001 | Gopinathan et al. |
| 6,430,539 | B1 | 8/2002 | Lazarus et al. |
| 6,611,816 | B2* | 8/2003 | Lebda et al. ..................... 705/38 |
| 2001/0056399 | A1 | 12/2001 | Saylors |
| 2002/0111901 | A1 | 8/2002 | Whitney |
| 2003/0078877 | A1* | 4/2003 | Beirne et al. ..................... 705/38 |
| 2005/0273406 | A1 | 12/2005 | Lebda et al. |
| 2006/0247975 | A1* | 11/2006 | Shapiro et al. .................. 705/14 |
| 2008/0255986 | A1* | 10/2008 | Scarborough et al. .......... 705/38 |

OTHER PUBLICATIONS

Bill Me Later; CIT Bank, Salt Lake City, Utah; Copyright 2004-2007 (1 pg) http://www.bill-me-later.com/wss/index.do.
Telecheck; First Data Corporation (2 pgs.) http://www.firstdata.com/product_solutions/payment_solutions/telecheck/index.htm.

* cited by examiner

*Primary Examiner* — Ojo O Oyebisi
(74) *Attorney, Agent, or Firm* — Greenberg Traurig, LLP (57) ABSTRACT

One embodiment of the present invention relates to a computer implemented method for transaction processing that includes: transacting for a first and a second transactions for at least one of: a purchase; and a cash advance; sending requests for authorization of the first and second transactions; declining, by a primary lender, the requests for authorization; evaluating the declined requests for authorization by a secondary lender; authorizing, by the secondary lender, the declined requests for authorization in the form of authorization approvals; communicating the authorization approvals by the primary lender; posting the transactions to a balance sheet of the secondary lender in the form of amounts due to the primary lender; funding the transactions by the primary lender; summing up one or more debits and one or more credits of the posted transactions of the secondary lender; and settling any amounts due between the primary and secondary lenders.

44 Claims, 7 Drawing Sheets

SYSTEMS AND METHODS FOR TRANSACTION PROCESSING AND BALANCE TRANSFER PROCESSING

FIELD OF THE INVENTION

Various embodiments of the present invention relate to systems and methods for transaction processing. In one example, the transactions may be by customers for purchases and/or cash advances. In another example, the transactions may be made at a point of sale or an automatic teller machine or bank teller. Other embodiments of the present invention relate to systems and methods for balance transfer processing. In one example, customers may make balance transfer requests to obtain loans so as to make a payment to a third party.

For the purposes of describing and claiming the present invention, the term "an amount due" is intended to include (but not be limited to) a loan and/or credit guarantee.

BACKGROUND OF THE INVENTION

Various financing and loan processing systems and methods have been proposed. Examples include what is disclosed in the following patent documents:

U.S. Patent Application Publication 2001/0056399, entitled "WEB DEPENDENT CONSUMER FINANCING AND VIRTUAL RESELLING METHOD" and published on Dec. 27, 2001 in the name of Saylors; U.S. Patent Application Publication 2002/0111901, entitled "LOAN SERVICING SYSTEM" and published on Aug. 15, 2002 in the name of Whitney; U.S. Patent Application Publication 2005/0273406, entitled "METHOD AND COMPUTER NETWORK FOR CO-ORDINATING A LOAN OVER THE INTERNET" and published on Dec. 8, 2005 in the name of Lebda et al.; U.S. Patent Application Publication 2006/0247975, entitled "PROCESSES AND SYSTEMS EMPLOYING MULTIPLE SOURCES OF FUNDS" and published on Nov. 2, 2006 in the name of Shapiro et al.; U.S. Pat. No. 6,029,149, entitled "LENDER DIRECT CREDIT EVALUATION AND LOAN PROCESSING SYSTEM" and issued on Feb. 22, 2000 in the name of Dykstra et al.; U.S. Pat. No. 5,878,403, entitled "COMPUTER IMPLEMENTED AUTOMATED CREDIT APPLICATION ANALYSIS AND DECISION ROUTING SYSTEM" and issued on Mar. 2, 1999 in the name of DeFrancesco et al.; U.S. Pat. No. 5,621,201, entitled "AUTOMATED PURCHASING CONTROL SYSTEM" and issued on Apr. 15, 1997 in the name of Langhans et al.; U.S. Pat. No. 5,819,226, entitled "FRAUD DETECTION USING PREDICTIVE MODELING" and issued on Oct. 6, 1998 in the name of Gopinathan et al.; U.S. Pat. No. 5,870,721, entitled "SYSTEM AND METHOD FOR REAL TIME LOAN APPROVAL" and issued on Feb. 9, 1999 in the name of Norris; U.S. Pat. No. 5,991,750, entitled "SYSTEM AND METHOD FOR PRE-AUTHORIZATION OF INDIVIDUAL ACCOUNT TRANSACTIONS" and issued on Nov. 23, 1999 in the name of Watson; U.S. Pat. No. 6,029,154, entitled "METHOD AND SYSTEM FOR DETECTING FRAUD IN A CREDIT CARD TRANSACTION OVER THE INTERNET" and issued on Feb. 22, 2000 in the name of Pettitt; U.S. Pat. No. 6,119,103, entitled "FINANCIAL RISK PREDICTION SYSTEMS AND METHODS THEREFOR" and issued on Sep. 12, 2000 in the name of Basch et al.; U.S. Pat. No. 6,330,546, entitled "RISK DETERMINATION AND MANAGEMENT USING PREDICTIVE MODELING AND TRANSACTION PROFILES FOR INDIVIDUAL TRANSACTING ENTITIES" and issued on Dec. 11, 2001 in the name of Gopinathan et al.; and U.S. Pat. No. 6,430,539, entitled "PREDICTIVE MODELING OF CONSUMER FINANCIAL BEHAVIOR" and issued on Aug. 6, 2002 in the name of Lazarus et al.

Other examples of financing and loan processing systems and methods include the following:

The "BILL ME LATER" service, offered through CIT Bank, Salt Lake City, Utah (see, http://www.bill-me-later.com/wss/index.do); and the "TELECHECK" service, offered through FIRST DATA CORPORATION (see, http://www.firstdata.com/product_solutions/payment_solutions/telecheck/index.htm).

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Referring now to the Figs., various embodiments of the present invention will now be described.

Figure 1:
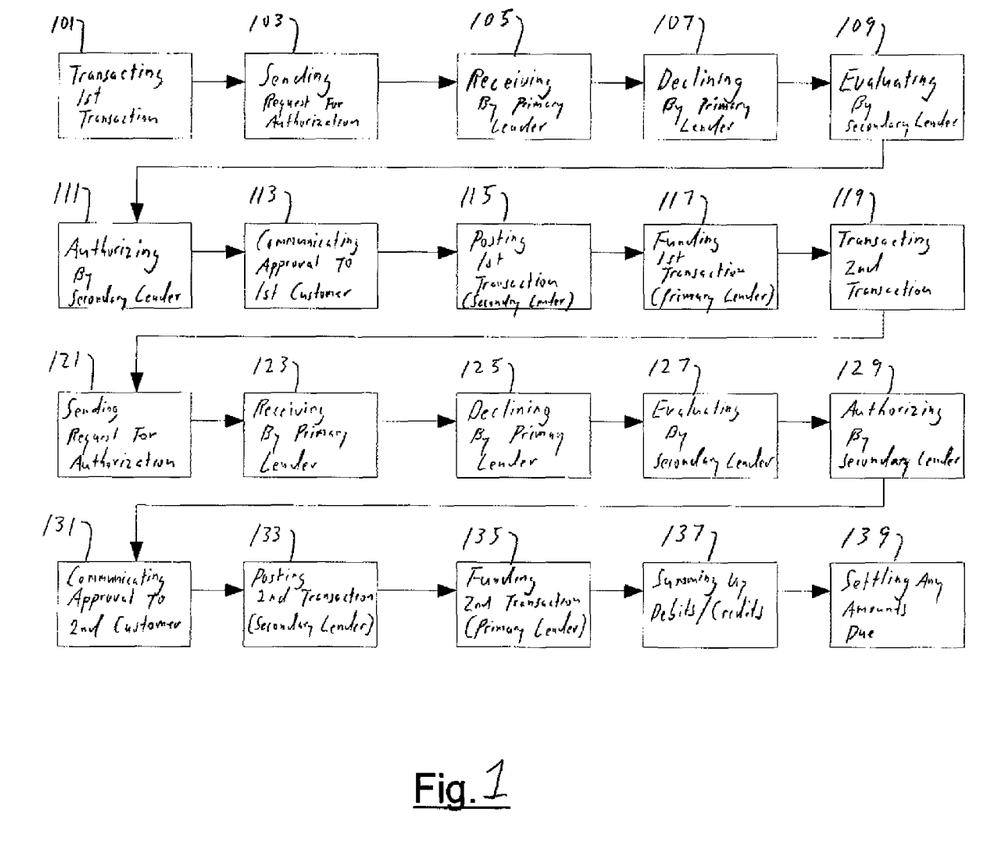
FIG. 1 is a block diagram showing a computer implemented method for transaction processing according to one embodiment of the present invention.

More particularly, as seen in FIG. 1, a computer implemented method for transaction processing according to one embodiment of the present invention is shown. As seen in this Fig., the method of this embodiment may begin at Step 101—transacting for a first transaction. In one example, the transacting may be by a first customer for at least one of: (1) a purchase; and (2) a cash advance. In another example, the transacting may be at a point of sale. In another example, the transacting may be at an automatic teller machine or at a bank teller. In another example, the transacting may be done electronically, such as over an electronic network. The method may then continue to Step 103—sending a request for authorization of the first transaction (e.g., in the form of a first authorization request). In one example, the sending may be done electronically, such as over an electronic network. The method may then continue to Step 105—receiving, by a primary lender, the first authorization request. In one example, the receiving may be done electronically, such as over an electronic network. The method may then continue to Step 107—declining, by the primary lender, the first authorization request. In one example, the declining may be done electronically, such as over an electronic network. The method may then continue to Step 109—evaluating the declined first authorization request by a secondary lender (the secondary lender may evaluate the declined first authorization request prior to a communication to the first customer of the decline of the first authorization request by the primary lender and the secondary lender may evaluate the declined first authorization request based at least in part on evaluation criteria of the secondary lender). In one example, the evaluating may be done electronically, such as over an electronic network. The method may then continue to Step 111—authorizing, by the secondary lender, the declined first authorization request if the evaluation meets the secondary lender's criteria (the authorizing may be in the form of a first authorization approval). In one example, the authorizing may be done electronically, such as over an electronic network. The method may then continue to Step 113—communicating the first authorization approval to the first customer. In one example, the communicating may be done electronically, such as over an electronic network. The method may then continue to Step 115—posting the first transaction to a balance sheet of the secondary lender (the posting may be in the form of an amount due to the primary lender). In one example, the posting may be done electronically, such as over an electronic network. The method may then continue to Step 117—funding the first transaction by the primary lender. In one example, the funding may be done electronically, such as over an electronic network. The method may then continue to Step 119—transacting for a second transaction. In one example, the transacting may be by a second customer for at least one of: (1) a purchase; and (2) a cash advance. In another example, the transacting may be at a point of sale. In another example, the transacting may be at an automatic teller machine or at a bank teller. The method may then continue to Step 121—sending a request for authorization of the second transaction (e.g., in the form of a second authorization request). In one example, the sending may be done electronically, such as over an electronic network. The method may then continue to Step 123—receiving, by the primary lender, the second authorization request. In one example, the receiving may be done electronically, such as over an electronic network. The method may then continue to Step 125—declining, by the primary lender, the second authorization request. In one example, the declining may be done electronically, such as over an electronic network. The method may then continue to Step 127—evaluating the declined second authorization request by the secondary lender (the secondary lender may evaluate the declined second authorization request prior to a communication to the second customer of the decline of the second authorization request by the primary lender, and the secondary lender may evaluate the declined second authorization request based at least in part on evaluation criteria of the secondary lender). In one example, the evaluating may be done electronically, such as over an electronic network. The method may then continue to Step 129—authorizing, by the secondary lender, the declined second authorization request if the evaluation meets the secondary lender's criteria (the authorizing may be in the form of a second authorization approval). In one example, the authorizing may be done electronically, such as over an electronic network. The method may then continue to Step 131—communicating the second authorization approval to the second customer. In one example, the communicating may be done electronically, such as over an electronic network. The method may then continue to Step 133—posting the second transaction to the balance sheet of the secondary lender (the posting may be in the form of an amount due to the primary lender). In one example, the posting may be done electronically, such as over an electronic network. The method may then continue to Step 135—funding the second transaction by the primary lender. In one example, the funding may be done electronically, such as over an electronic network. The method may then continue to Step 137—summing up one or more debits and one or more credits of the first and second posted transactions of the secondary lender. In one example, the summing up may be done electronically, such as over an electronic network. The method may then continue to Step 139—settling any amounts due between the primary and secondary lenders. In one example, the settling may be done electronically, such as over an electronic network.

In another example, the evaluation criteria of the secondary lender may comprise at least one of: (1) credit risk; and (2) profitability.

In another example, each of the declined first authorization request and the declined second authorization request may be sent to the secondary lender from the primary lender.

In another example, the method may further comprise receiving payment from each of the first and second customers.

In another example, each received payment may be owed to at least one of the primary and secondary lenders.

In another example, the method may further comprise allocating each received payment between each of the primary and secondary lenders based on a payment hierarchy.

In another example, at least one of the first and second transactions may be carried out via use of a credit card account.

In another example, at least one of the first and second transactions may be carried out via use of a charge card account.

In another example, at least one of the first and second transactions may be carried out via use of an unsecured or secured credit account.

In another example, at least one of the first and second transactions may be carried out via use of a debit card account.

In another example, the steps may be carried out in the order recited.

Figure 2:
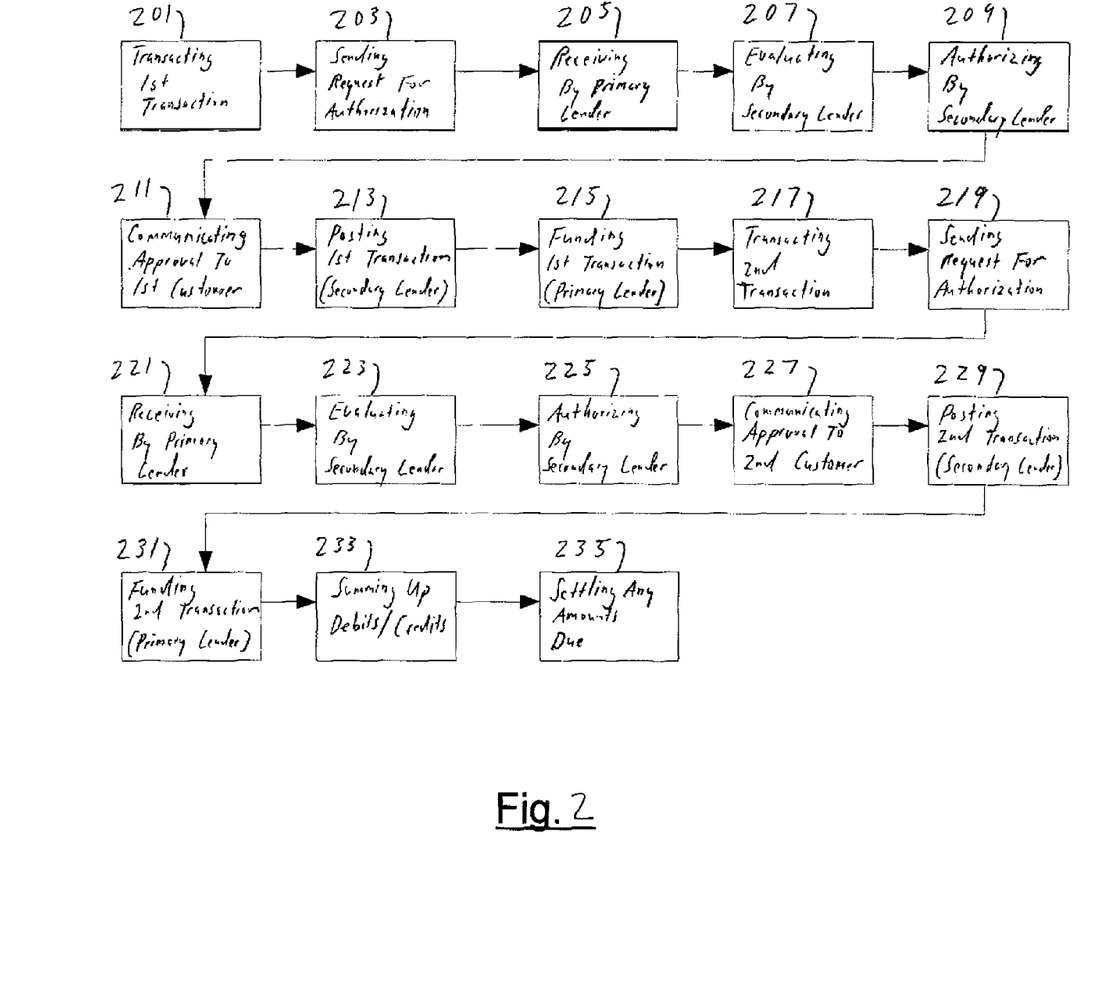
FIG. 2 is a block diagram showing a computer implemented method for transaction processing according to another embodiment of the present invention.

Referring now to FIG. 2, a computer implemented method for transaction processing according to another embodiment of the present invention is shown. As seen in this Fig., the method of this embodiment may begin at Step 201—transacting for a first transaction. In one example, the transacting may be by a first customer for at least one of: (1) a purchase; and (2) a cash advance. In another example, the transacting may be at a point of sale. In another example, the transacting may be at an automatic teller machine or at a bank teller. In one example, the transacting may be done electronically, such as over an electronic network. The method may then continue to Step-203—sending a request for authorization of the first transaction (e.g., in the form of a first authorization request). In one example, the sending may be done electronically, such as over an electronic network. The method may then continue to Step 205—receiving, by a primary lender, the first authorization request. In one example, the receiving may be done electronically, such as over an electronic network. The method may then continue to Step 207—evaluating the first authorization request by a secondary lender (the secondary lender may evaluate the first authorization request prior to a communication to the first customer of a decline of the first authorization request by the primary lender and the secondary lender may evaluate the first authorization request based at least in part on evaluation criteria of the secondary lender). In one example, the evaluating may be done electronically, such as over an electronic network. The method may then continue to Step 209—authorizing, by the secondary lender, the first authorization request (e.g., in the form of a first authorization approval) if: i) the primary lender declines the first authorization request; and ii) the evaluation meets the secondary lender's criteria. In one example, the authorizing may be done electronically, such as over an electronic network. The method may then continue to Step 211—communicating the first authorization approval to the first customer. In one example, the communicating may be done electronically, such as over an electronic network. The method may then continue to Step 213—posting the first transaction to a balance sheet of the secondary lender (the posting may be in the form of an amount due to the primary lender). In one example, the posting may be done electronically, such as over an electronic network. The method may then continue to Step 215—funding the first transaction by the primary lender. In one example, the funding may be done electronically, such as over an electronic network. The method may then continue to Step 217—transacting for a second transaction. In one example, the transacting may be by a second customer for at least one of: (1) a purchase; and (2) a cash advance. In another example, the transacting may be at a point of sale. In another example, the transacting may be at an automatic teller machine or at a bank teller. The method may then continue to Step 219—sending a request for authorization of the second transaction (e.g., in the form of a second authorization request). In one example, the sending may be done electronically, such as over an electronic network. The method may then continue to Step 221—receiving, by the primary lender, the second authorization request. In one example, the receiving may be done electronically, such as over an electronic network. The method may then continue to Step 223—evaluating the second authorization request by the secondary lender (the secondary lender may evaluate the second authorization request prior to a communication to the second customer of a decline of the second authorization request by the primary lender and the secondary lender may evaluate the second authorization request based at least in part on evaluation criteria of the secondary lender). In one example, the evaluating may be done electronically, such as over an electronic network. The method may then continue to Step 225—authorizing, by the secondary lender, the second authorization request (e.g., in the form of a second authorization approval) if: i) the primary lender declines the second authorization request; and ii) the evaluation meets the secondary lender's criteria. In one example, the authorizing may be done electronically, such as over an electronic network. The method may then continue to Step 227—communicating the second authorization approval to the second customer. In one example, the communicating may be done electronically, such as over an electronic network. The method may then continue to Step 229—posting the second transaction to the balance sheet of the secondary lender (the posting may be in the form of an amount due to the primary lender). In one example, the posting may be done electronically, such as over an electronic network. The method may then continue to Step 231—funding the second transaction by the primary lender. In one example, the funding may be done electronically, such as over an electronic network. The method may then continue to Step 233—summing up one or more debits and one or more credits of the first and second posted transactions of the secondary lender. In one example, the summing up may be done electronically, such as over an electronic network. The method may then continue to Step 235—settling any amounts due between the primary and secondary lenders. In one example, the settling may be done electronically, such as over an electronic network.

In another example, the evaluation criteria of the secondary lender may comprise at least one of: (1) credit risk; and (2) profitability.

In another example, each of the declined first authorization request and the declined second authorization request may be sent to the secondary lender from the primary lender.

In another example, the method may further comprise receiving payment from each of the first and second customers.

In another example, each received payment may be owed to at least one of the primary and secondary lenders.

In another example, the method may further comprise allocating each received payment between each of the primary and secondary lenders based on a payment hierarchy.

In another example, at least one of the first and second transactions may be carried out via use of a credit card account.

In another example, at least one of the first and second transactions may be carried out via use of a charge card account.

In another example, at least one of the first and second transactions may be carried out via use of an unsecured or secured credit account.

In another example, at least one of the first and second transactions may be carried out via use of a debit card account.

In another example, the steps may be carried out in the order recited.

Figure 3:
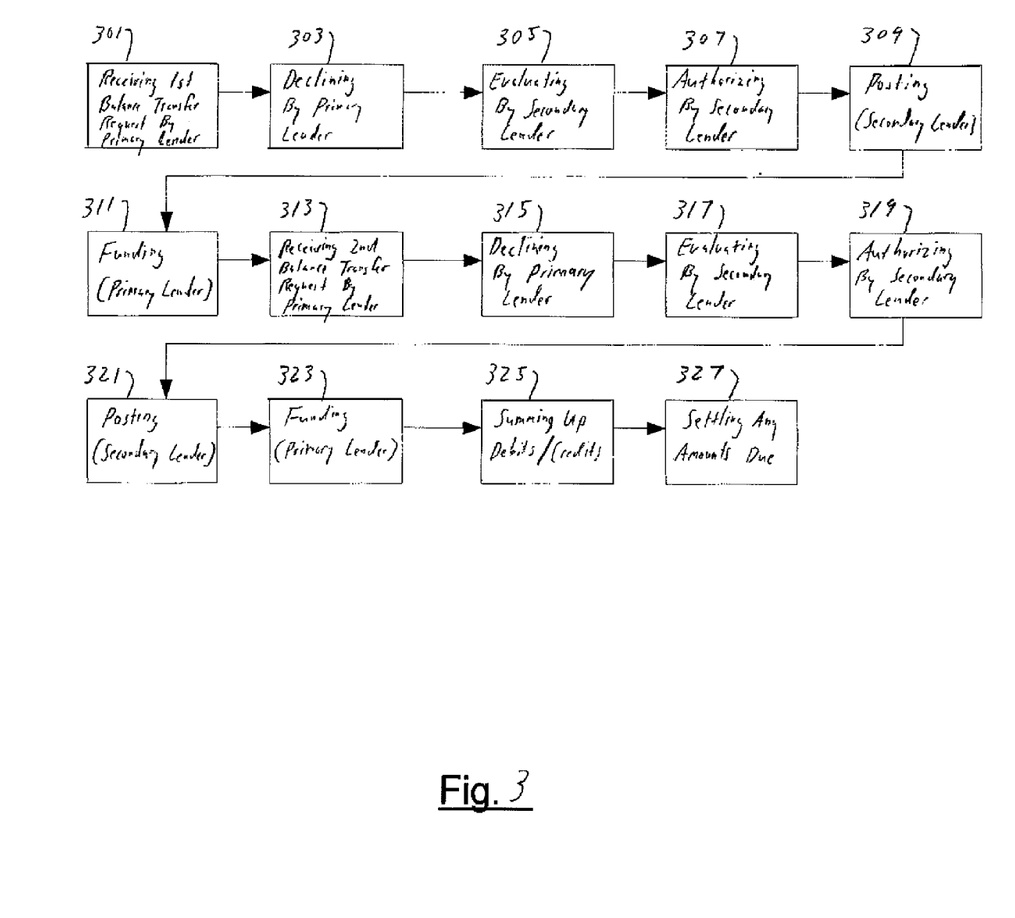
FIG. 3 is a block diagram showing a computer implemented method for balance transfer processing according to another embodiment of the present invention.

Referring now to FIG. 3, a computer implemented method for balance transfer processing according to another embodiment of the present invention is shown. As seen in this Fig., the method of this embodiment may begin at Step 301—receiving, by a primary lender, a first balance transfer request from a first customer. In one example, the first balance transfer request may be a request by the first customer to obtain a loan from the primary lender so as to make a payment to a third party. In another example, the receiving may be done electronically, such as over an electronic network. The method may then continue to Step 303—declining, by the primary lender, the first balance transfer request. In one example, the declining may be done electronically, such as over an electronic network. The method may then continue to Step 305—evaluating the declined first balance transfer request by a secondary lender (the secondary lender may evaluate the declined first balance transfer request prior to a communication to the first customer of the decline of the first balance transfer request by the primary lender and the secondary lender may evaluate the declined first balance transfer request based at least in part on evaluation criteria of the secondary lender). In one example, the evaluating may be done electronically, such as over an electronic network. The method may then continue to Step 307—authorizing, by the secondary lender, the declined first balance transfer request if the evaluation meets the secondary lender's criteria (the authorizing may be in the form of a first balance transfer approval). In one example, the authorizing may be done electronically, such as over an electronic network. The method may then continue to Step 309—posting the first balance transfer to a balance sheet of the secondary lender (the posting may be in the form of an amount due to the primary lender). In one example, the posting may be done electronically, such as over an electronic network. The method may then continue to Step 311—funding the first balance transfer by the primary lender. In one example, the funding may be done electronically, such as over an electronic network. The method may then continue to Step 313—receiving, by the primary lender, a second balance transfer request from a second customer. In one example, the second balance transfer request may be a request by the second customer to obtain a loan from the primary lender so as to make a payment to a third party. In another example, the receiving may be done electronically, such as over an electronic network. The method may then continue to Step 315—declining, by the primary lender, the second balance transfer request. In one example, the declining may be done electronically, such as over an electronic network. The method may then continue to Step 317—evaluating the declined second balance transfer request by the secondary lender (the secondary lender may evaluate the declined second balance transfer request prior to a communication to the second customer of the decline of the second balance transfer request by the primary lender and the secondary lender may evaluate the declined second balance transfer request based at least in part on evaluation criteria of the secondary lender). In one example, the evaluating may be done electronically, such as over an electronic network. The method may then continue to Step 319—authorizing, by the secondary lender, the declined second balance transfer request if the evaluation meets the secondary lender's criteria (the authorizing may be in the form of a second balance transfer approval). In one example, the authorizing may be done electronically, such as over an electronic network. The method may then continue to Step 321—posting the second balance transfer to the balance sheet of the secondary lender (the posting may be in the form of an amount due to the primary lender). In one example, the posting may be done electronically, such as over an electronic network. The method may then continue to Step 323—funding the second balance transfer by the primary lender. In one example, the funding may be done electronically, such as over an electronic network. The method may then continue to Step 325—summing up one or more debits and one or more credits of the first and second posted balance transfers of the secondary lender. In one example, the summing up may be done electronically, such as over an electronic network. The method may then continue to Step 327—settling any amounts due between the primary and secondary lenders. In one example, the settling may be done electronically, such as over an electronic network.

In another example, the evaluation criteria of the secondary lender may comprise at least one of: (1) credit risk; and (2) profitability.

In another example, each of the declined first balance transfer request and the declined second balance transfer request may be sent to the secondary lender from the primary lender.

In another example, the method may further comprise receiving payment from each of the first and second customers.

In another example, each received payment may be owed to at least one of the primary and secondary lenders.

In another example, the method may further comprise allocating each received payment between each of the primary and secondary lenders based on a payment hierarchy.

In another example, at least one of the first and second transactions may be carried out via use of a credit card account.

In another example, at least one of the first and second transactions may be carried out via use of a charge card account.

In another example, at least one of the first and second transactions may be carried out via use of an unsecured or secured credit account.

In another example, at least one of the first and second transactions may be carried out via use of a debit card account.

In another example, the steps may be carried out in the order recited.

Figure 4:
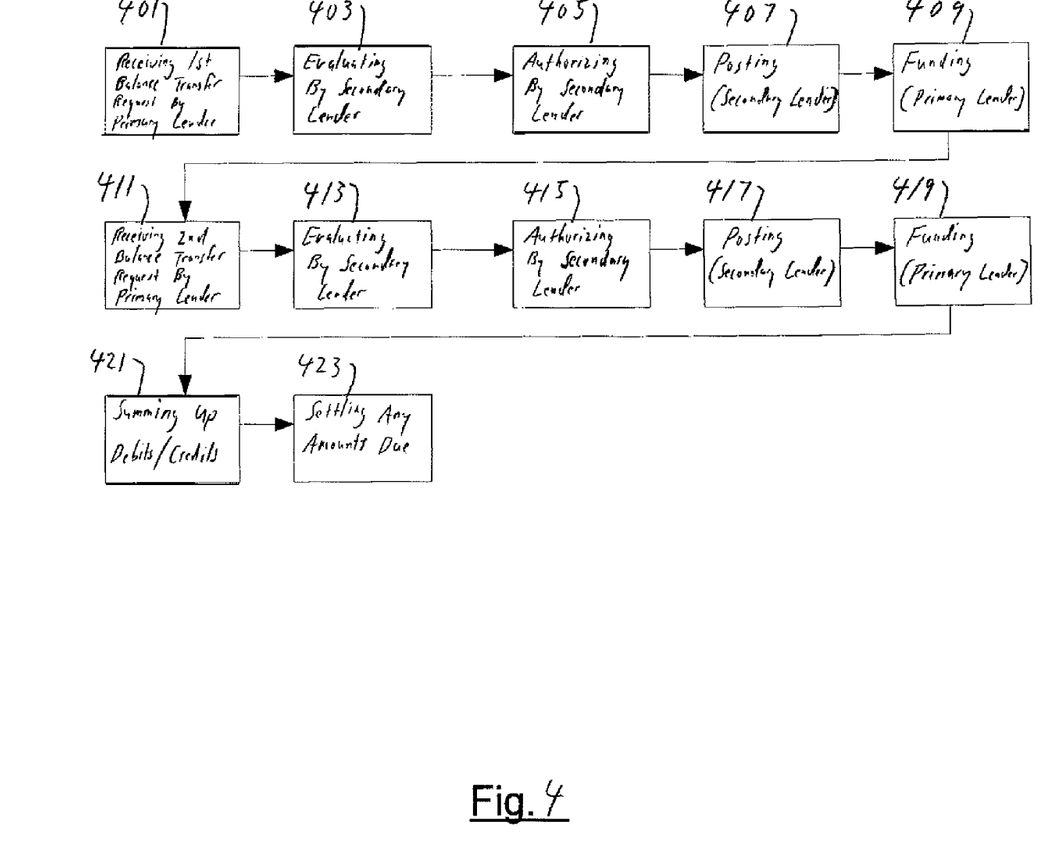
FIG. 4 is a block diagram showing a computer implemented method for balance transfer processing according to another embodiment of the present invention.

Referring now to FIG. 4, a computer implemented method for balance transfer processing according to another embodiment of the present invention is shown. As seen in this Fig., the method of this embodiment may begin at Step 401—receiving, by a primary lender, a first balance transfer request from a first customer. In one example, the first balance transfer request may be a request by the first customer to obtain a loan from the primary lender so as to make a payment to a third party. In another example, the receiving may be done electronically, such as over an electronic network. The method may then continue to Step 403—evaluating the first balance transfer request by a secondary lender (the secondary lender may evaluate the first balance transfer request prior to a communication to the first customer of a decline of the first balance transfer request by the primary lender and the secondary lender may evaluate the first balance transfer request based at least in part on evaluation criteria of the secondary lender) In one example, the evaluating may be done electronically, such as over an electronic network. The method may then continue to Step 405—authorizing, by the secondary lender, the first balance transfer request (e.g., in the form of a first balance transfer approval) if: i) the primary lender declines the first balance transfer request; and ii) the evaluation meets the secondary lender's criteria. In one example, the authorizing may be done electronically, such as over an electronic network. The method may then continue to Step 407—posting the first balance transfer to a balance sheet of the secondary lender (the posting may be in the form of an amount due to the primary lender). In one example, the posting may be done electronically, such as over an electronic network. The method may then continue to Step 409—funding the first balance transfer by the primary lender. In one example, the funding may be done electronically, such as over an electronic network. The method may then continue to Step 411—receiving, by the primary lender, a second balance transfer request from a second customer. In one example, the second balance transfer request may be a request by the second customer to obtain a loan from the primary lender so as to make a payment to a third party. In another example, the receiving may be done electronically, such as over an electronic network. The method may then continue to Step 413—evaluating the second balance transfer request by the secondary lender (the secondary lender may evaluate the second balance transfer request prior to a communication to the second customer of a decline of the second balance transfer request by the primary lender and the secondary lender may evaluate the second balance transfer request based at least in part on evaluation criteria of the secondary lender). In one example, the evaluating may be done electronically, such as over an electronic network. The method may then continue to Step 415—authorizing, by the secondary lender, the second balance transfer request (e.g., in the form of a second balance transfer approval) if: i) the primary lender declines the second balance transfer request; and ii) the evaluation meets the secondary lender's criteria. In one example, the authorizing may be done electronically, such as over an electronic network. The method may then continue to Step 417—posting the second balance transfer to the balance sheet of the secondary lender (the posting may be in the form of an amount due to the primary lender). In one example, the posting may be done electronically, such as over an electronic network. The method may then continue to Step 419—funding the second balance transfer by the primary lender. In one example, the funding may be done electronically, such as over an electronic network. The method may then continue to Step 421—summing up one or more debits and one or more credits of the first and second posted balance transfers of the secondary lender. In one example, the summing up may be done electronically, such as over an electronic network. The method may then continue to Step 423—settling any amounts due between the primary and secondary lenders. In one example, the settling may be done electronically, such as over an electronic network.

In another example, the evaluation criteria of the secondary lender may comprise at least one of (1) credit risk; and (2) profitability.

In another example, each of the declined first balance transfer request and the declined second balance transfer request may be sent to the secondary lender from the primary lender.

In another example, the method may further comprise receiving payment from each of the first and second customers.

In another example, each received payment may be owed to at least one of the primary and secondary lenders.

In another example, the method may further comprise allocating each received payment between each of the primary and secondary lenders based on a payment hierarchy.

In another example, at least one of the first and second transactions may be carried out via use of a credit card account.

In another example, at least one of the first and second transactions may be carried out via use of a charge card account.

In another example, at least one of the first and second transactions may be carried out via use of an unsecured or secured credit account.

In another example, at least one of the first and second transactions may be carried out via use of a debit card account.

In another example, the steps may be carried out in the order recited.

Reference will now be made to a specific conventional balance transfer issue as well as to one solution provided by an embodiment of the present invention.

In one example of the present invention (which is merely illustrative) a 3rd party (e.g., distinct from the bank) offers to take an additional $500 that the bank will not take (e.g., for a balance transfer, cash advance or purchase). Such 3rd party may be able to take more risk than the bank (e.g., the 3rd party may have alternative financing and risk tolerance.). The decision by the 3rd party whether to take the additional $500 that the bank will not take may be based, for example, upon credit risk and profitability evaluation criteria.

Figure 5:
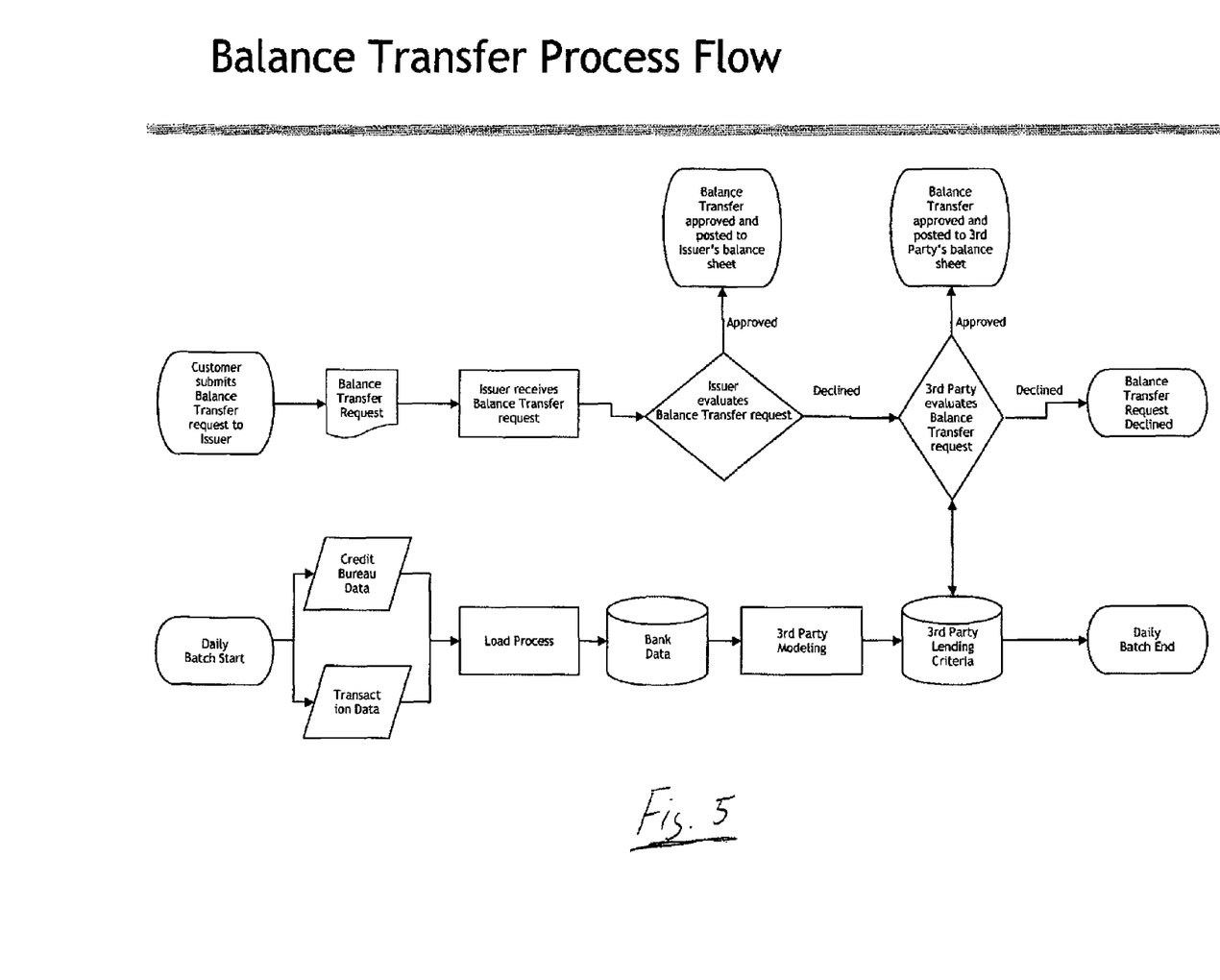
FIG. 5 is a block diagram showing a computer implemented method for balance transfer processing according to another embodiment of the present invention.

Referring now to FIG. 5, a computer implemented method for balance transfer processing according to another embodiment of the present invention is shown. Of note, the daily batch processing may occur at any desired time(s) throughout the day (e.g., in the morning before the opening of business or in the evening after the close of business—in addition, there may be one or more balance transfer requests corresponding to each batch process).

Figure 6:
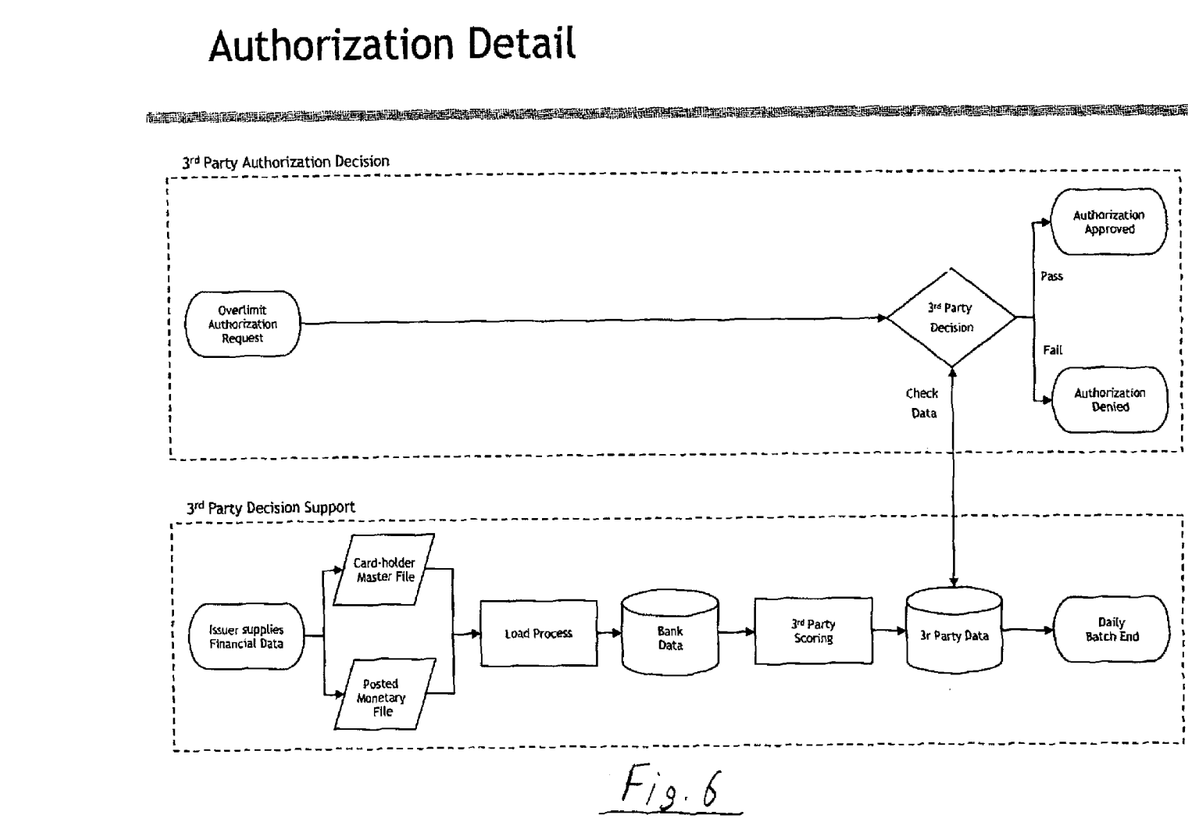
FIG. 6 is a block diagram showing a computer implemented method for purchase and cash advance processing according to another embodiment of the present invention.

Referring now to FIG. 6, a computer implemented method for purchase and cash advance processing according to another embodiment of the present invention is shown. Of note, the daily batch processing may occur at any desired time(s) throughout the day (e.g., in the morning before the opening of business or in the evening after the close of business—in addition, there may be one or more decisions corresponding to each batch process).

Figure 7:
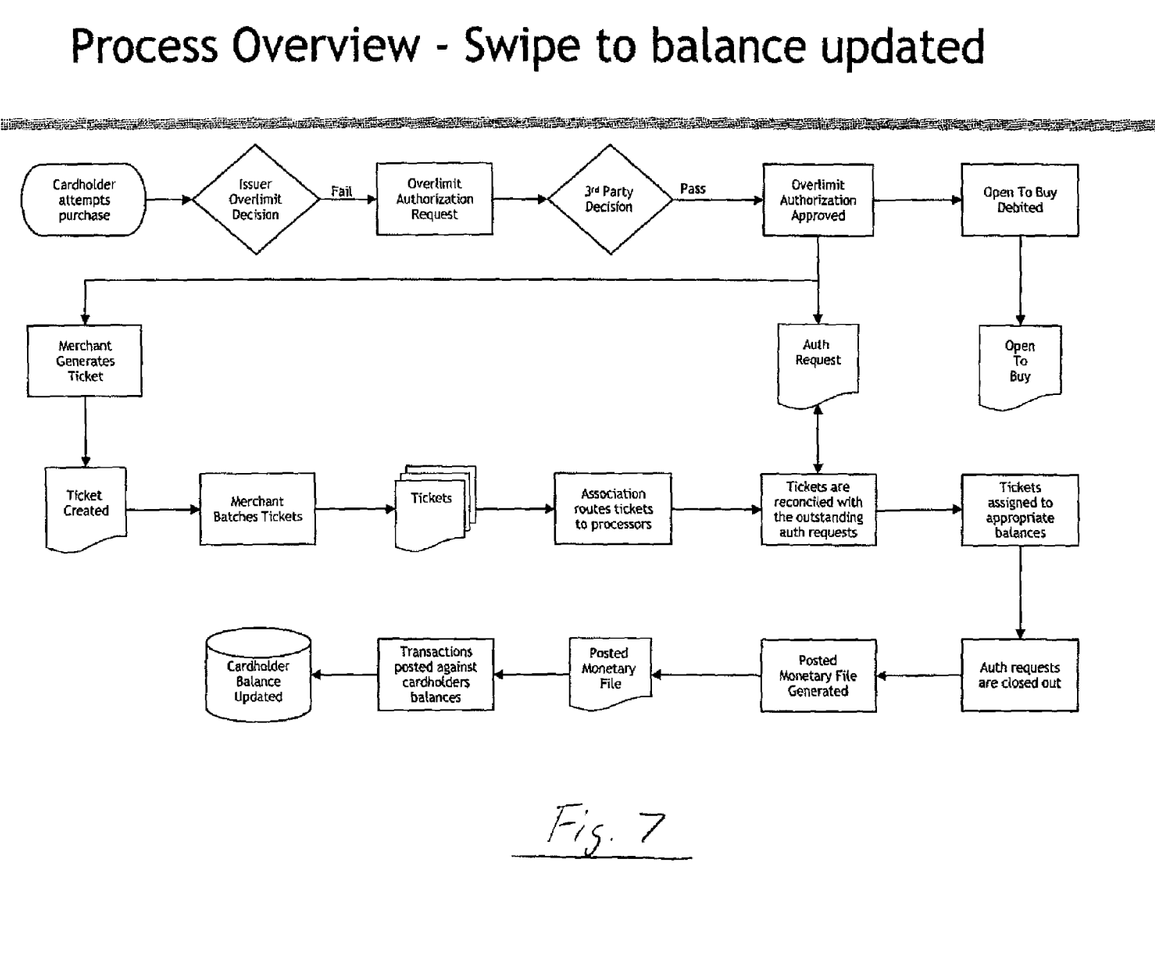
FIG. 7 is a block diagram showing a computer implemented method for purchase and cash advance processing (with additional details regarding balance sheet posting) according to another embodiment of the present invention.

Referring now to FIG. 7, a computer implemented method for purchase and cash advance processing (with additional details regarding balance sheet posting) according to another embodiment of the present invention is shown. Of note, any batch processing (e.g., daily) may occur at any desired time(s) throughout the day (e.g., in the morning before the opening of business or in the evening after the close of business—in addition, there may be one or more transactions corresponding to each batch process).

In another example, one or more of the steps described herein may be carried out in real-time (e.g., real-time authorization by the secondary lender while the customer is at the point of sale, automatic teller machine or bank teller).

In another example, one or more of the steps described herein may be carried out not in real-time (e.g., not while the customer is at the point of sale, automatic teller machine or bank teller).

In another example, the present invention may provide the ability to maintain two balance sheets of one customer with the primary lender.

In another example, the present invention may be utilized in connection with so-called "convenience checks", such as provided by a credit card issuer (such "convenience checks" may operate similar to the balance transfer).

Of note, the embodiments described herein may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a server, a network (e.g., an intranet and/or the Internet)), the type of computer programming techniques that may be used (e.g., object oriented programming), and the type of computer programming languages that may be used (e.g., C++, Cobol, Java, Javascript). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods have been described herein as being "computer implementable" or "computer implemented." In this regard, it is noted that while such methods can be implemented using a computer, the methods do not necessarily have to be implemented using a computer. Also, to the extent that such methods are implemented using a computer, not every step must necessarily be implemented using a computer. Further, any specific dates, time spans, dollar amounts, interest rates, values and the like described herein are, of course, illustrative and not restrictive. Further still, any authorizations and/or declines may be made in full or in part (e.g., one entity may authorize part of a request and decline the remainder of the request and another entity may authorize the remainder of the request). Further still, the evaluation criteria applied by the secondary lender may be the same for each customer, may differ for different customers, may be the same for each transaction or may be different for different transactions. Further still, the credit risk evaluation criteria may apply to the customer and the profitability evaluation criteria may apply to the secondary lender. Further still, the third party to receive the payment based on the loan from the primary lender may be the same for each customer or may differ for one or more different customers. Further still, the various steps may be carried out in any desired order. Further still, any desired steps may be added and/or any desired steps may be eliminated. Further still, any desired steps may be combined (e.g., from two or more steps into a single step) and/or any desired steps may be separated (e.g., from a single step into two or more steps).

What is claimed is:

1. A computer implemented method for transaction processing, comprising:
   receiving, by a computer of a primary lender, a first authorization request, wherein the first authorization request is a request for authorization of a first transaction and wherein the first transaction is a transaction is of a first customer for at least one of: (1) a purchase and (2) a cash advance;
   declining, by the computer of the primary lender, the first authorization request;
   evaluating, by a computer of a secondary lender, in real-time, the declined first authorization request, wherein the computer of the secondary lender evaluates the declined first authorization request prior to a communication of the decline of the first authorization request by the primary lender, and wherein the computer of the secondary lender evaluates the declined first authorization request based at least in part on at least one evaluation condition of the secondary lender;
   authorizing, by the computer of the secondary lender, in real-time, the declined first authorization request if the evaluation meets the secondary lender's at least one evaluation condition, wherein the authorizing is in the form of a first authorization approval;
   communicating, by the computer of the primary lender, the first authorization approval;
   posting, by the computer of the secondary lender, the first transaction to a balance sheet of the secondary lender in the form of a first amount due to the primary lender;
   funding, by the computer of the primary lender, the first transaction by the primary lender;
   receiving, by the computer of the primary lender, a second authorization request, wherein the second authorization request is a request for authorization of a second transaction and wherein the second transaction is a transaction is of a second customer for at least one of: (1) a purchase and (2) a cash advance;
   declining, by the computer of the primary lender, the second authorization request;
   evaluating, by the computer of the secondary lender, in real-time, the declined second authorization request by the secondary lender, wherein the computer of the secondary lender evaluates the declined second authorization request prior to a communication of the decline of the second authorization request by the primary lender, and wherein the computer of the secondary lender evaluates the declined second authorization request based at least in part on the at least one evaluation condition of the secondary lender;
   authorizing, by the computer of the secondary lender, in real-time, the declined second authorization request if the evaluation meets the secondary lender's at least one evaluation condition, wherein the authorizing is in the form of a second authorization approval;
   communicating, by the computer of the primary lender, the second authorization approval;
   posting, by the computer of the secondary lender, the second transaction to the balance sheet of the secondary lender in the form of second amount due to the primary lender;
   funding, by the computer of the primary lender, the second transaction by the primary lender;
   summing up, by a third computer, one or more debits and one or more credits of the first and second posted transactions; and
   settling, by the third computer, at least one amount due between the primary and secondary lenders based on at least in part on:
   i) on the funding of first and second transactions of the first and the second customers respectively by the primary lender, and
   ii) the posted first and second amounts due to the primary lender from the secondary lender, wherein the posted first and second amounts are based on funding of the first and second transactions of the first and the second customers respectively by the primary lender.

2. The method of claim 1, wherein the evaluation criteria of the secondary lender comprises at least one of: (1) credit risk; and (2) profitability.

3. The method of claim 1, wherein each of the declined first authorization request and the declined second authorization request is sent, by a computer, to the secondary lender from the primary lender.

4. The method of claim 1, further comprising receiving, by a computer, payment from each of the first and second customers.

5. The method of claim 4, wherein each received payment is owed to at least one of the primary and secondary lenders.

6. The method of claim 5, further comprising allocating, by a computer, each received payment between each of the primary and secondary lenders based on a payment hierarchy.

7. The method of claim 1, wherein at least one of the first and second transactions is carried out via use of a credit card account.

8. The method of claim 1, wherein at least one of the first and second transactions is carried out via use of a charge card account.

9. The method of claim 1, wherein at least one of the first and second transactions is carried out via use of an unsecured or secured credit account.

10. The method of claim 1, wherein at least one of the first and second transactions is carried out via use of a debit card account.

11. The method of claim 1, wherein the steps are carried out in the order recited.

12. A computer implemented method for transaction processing, comprising:
   receiving, by a computer of a primary lender, a first authorization request, wherein the first authorization request is a request for authorization of a first transaction and wherein the first transaction is a transaction is of a first customer for at least one of: (1) a purchase and (2) a cash advance;
   evaluating, in real-time, the first authorization request by a computer of a secondary lender, wherein the computer of the secondary lender evaluates the first authorization request prior to a communication of a decline of the first authorization request by the primary lender, and wherein the computer of the secondary lender evaluates the first authorization request based at least in part on at least one evaluation condition of the secondary lender;

authorizing, by the computer of the secondary lender, in real-time, the first authorization request in the form of a first authorization approval if:
i) the primary lender declines the first authorization request; and
ii) the evaluation meets the secondary lender's at least one evaluation condition;

communicating, by the computer of the primary lender, the first authorization approval;

posting, by the computer of the secondary lender, the first transaction to a balance sheet of the secondary lender in the form of a first amount due to the primary lender;

funding, by the computer of the primary lender, the first transaction by the primary lender;

receiving, by the computer of the primary lender, a second authorization request, wherein the second authorization request is a request for authorization of a second transaction and wherein the second transaction is a transaction is of a second customer for at least one of: (1) a purchase and (2) a cash advance;

evaluating, in real-time, the second authorization request by the computer of the secondary lender, wherein the computer of the secondary lender evaluates the second authorization request prior to a communication of a decline of the second authorization request by the primary lender, and wherein the computer of secondary lender evaluates the second authorization request based at least in part on the at least one evaluation condition of the secondary lender;

authorizing, by the computer of secondary lender, in real-time, the second authorization request in the form of a second authorization approval if:
i) the primary lender declines the second authorization request; and
ii) the evaluation meets the secondary lender's at least one evaluation condition;

communicating, by the computer of the primary lender, the second authorization approval;

posting, by the computer of the secondary lender, the second transaction to the balance sheet of the secondary lender in the form of a second amount due to the primary lender;

funding, by the computer of the primary lender, the second transaction by the primary lender;

summing up, by a third computer, one or more debits and one or more credits of the first and second posted transactions; and settling, by the third computer, at least one amount due between the primary and secondary lenders based on at least in part on:
i) on the funding of first and second transactions of the first and the second customers respectively by the primary lender, and
ii) the posted first and second amounts due to the primary lender from the secondary lender, wherein the posted first and second amounts are based on funding of the first and second transactions of the first and the second customers respectively by the primary lender.

13. The method of claim 12, wherein the evaluation criteria of the secondary lender comprises at least one of: (1) credit risk; and (2) profitability.

14. The method of claim 12, wherein each of the declined first authorization request and the declined second authorization request is sent to the secondary lender from the primary lender.

15. The method of claim 12, further comprising receiving, by a computer, payment from each of the first and second customers.

16. The method of claim 15, wherein each received payment is owed to at least one of the primary and secondary lenders.

17. The method of claim 16, further comprising allocating, a computer, each received payment between each of the primary and secondary lenders based on a payment hierarchy.

18. The method of claim 12, wherein at least one of the first and second transactions is carried out via use of a credit card account.

19. The method of claim 12, wherein at least one of the first and second transactions is carried out via use of a charge card account.

20. The method of claim 12, wherein at least one of the first and second transactions is carried out via use of an unsecured or secured credit account.

21. The method of claim 12, wherein at least one of the first and second transactions is carried out via use of a debit card account.

22. The method of claim 12, wherein the steps are carried out in the order recited.

23. A computer implemented method for balance transfer processing, comprising:
receiving, by a computer of a primary lender, a first balance transfer request from a first customer, wherein the first balance transfer request is a request by the first customer to obtain a loan from the primary lender so as to make a payment to a third party;

declining, by the computer of the primary lender, the first balance transfer request;

evaluating, in real-time, the declined first balance transfer request by a computer of a secondary lender, wherein the computer of the secondary lender evaluates the declined first balance transfer request prior to a communication of the decline of the first balance transfer request by the primary lender, and wherein the computer of the secondary lender evaluates the declined first balance transfer request based at least in part on at least one evaluation condition of the secondary lender;

authorizing, by the computer of the secondary lender, in real-time, the declined first balance transfer request if the evaluation meets the secondary lender's at least one evaluation condition, wherein the authorizing is in the form of a first balance transfer approval;

posting, by the computer of the secondary lender, the first balance transfer to a balance sheet of the secondary lender in the form of a first amount due to the primary lender;

funding the first balance transfer by the computer of the primary lender;

receiving, by the computer of the primary lender, a second balance transfer request from a second customer, wherein the second balance transfer request is a request by the second customer to obtain a loan from the primary lender so as to make a payment to a third party;

declining, by the computer of the primary lender, the second balance transfer request;

evaluating, in real-time, the declined second balance transfer request by the computer of the secondary lender, wherein the computer of the secondary lender evaluates the declined second balance transfer request prior to a communication of the decline of the second balance transfer request by the primary lender, and wherein the computer of the secondary lender evaluates the declined second balance transfer request based at least in part on the at least one evaluation condition of the secondary lender;

authorizing, by the computer of the secondary lender, in real-time, the declined second balance transfer request if the evaluation meets the secondary lender's at least one evaluation condition, wherein the authorizing is in the form of a second balance transfer approval;

posting, by the computer of the secondary lender, the second balance transfer to the balance sheet of the secondary lender in the form of a second amount due to the primary lender;

funding the second balance transfer by the computer of the primary lender;

summing up, by a third computer, one or more debits and one or more credits of the first and second posted balance transfers; and settling, by the third computer, at least one amounts due between the primary and secondary lenders based on at least in part on:
i) on the funding of first and second transactions of the first and the second customers respectively by the primary lender, and
ii) the posted first and second amounts due to the primary lender from the secondary lender, wherein the posted first and second amounts are based on funding of the first and second transactions of the first and the second customers respectively by the primary lender.

24. The method of claim 23, wherein the evaluation criteria of the secondary lender comprises at least one of: (1) credit risk; and (2) profitability.

25. The method of claim 23, wherein each of the declined first balance transfer request and the declined second balance transfer request is sent, by a computer, to the secondary lender from the primary lender.

26. The method of claim 23, further comprising receiving payment from each of the first and second customers.

27. The method of claim 26, wherein each received payment is owed to at least one of the primary and secondary lenders.

28. The method of claim 27, further comprising allocating, by a computer, each received payment between each of the primary and secondary lenders based on a payment hierarchy.

29. The method of claim 23, wherein at least one of the first and second transactions is carried out via use of a credit card account.

30. The method of claim 23, wherein at least one of the first and second transactions is carried out via use of a charge card account.

31. The method of claim 23, wherein at least one of the first and second transactions is carried out via use of an unsecured or secured credit account.

32. The method of claim 23, wherein at least one of the first and second transactions is carried out via use of a debit card account.

33. The method of claim 23, wherein the steps are carried out in the order recited.

34. A computer implemented method for balance transfer processing, comprising:
receiving, by a computer of a primary lender, a first balance transfer request from a first customer, wherein the first balance transfer request is a request by the first customer to obtain a loan from the primary lender so as to make a payment to a third party;

evaluating, in real-time, the first balance transfer request by a computer of a secondary lender, wherein the computer of the secondary lender evaluates the first balance transfer request prior to a communication of a decline of the first balance transfer request by the primary lender, and wherein the computer of the secondary lender evaluates the first balance transfer request based at least in part on at least one evaluation condition of the secondary lender;

authorizing, by the computer of the secondary lender, in real-time, the first balance transfer request in the form of a first balance transfer approval if:
i) the primary lender declines the first balance transfer request; and
ii) the evaluation meets the secondary lender's at least one evaluation condition;

posting, by the computer of the secondary lender, the first balance transfer to a balance sheet of the secondary lender in the form of a first amount due to the primary lender;

funding the first balance transfer by the computer of the primary lender;

receiving, by the computer of the primary lender, a second balance transfer request from a second customer, wherein the second balance transfer request is a request by the second customer to obtain a loan from the primary lender so as to make a payment to a third party;

evaluating, in real-time, the second balance transfer request by the computer of the secondary lender, wherein the computer of the secondary lender evaluates the second balance transfer request prior to a communication of a decline of the second balance transfer request by the primary lender, and wherein the computer of the secondary lender evaluates the second balance transfer request based at least in part on the at least one evaluation condition of the secondary lender;

authorizing, by the computer of the secondary lender, in real-time, the second balance transfer request in the form of a second balance transfer approval if:
i) the primary lender declines the second balance transfer request; and
ii) the evaluation meets the secondary lender's at least one evaluation condition;

posting, by the computer of the secondary lender, the second balance transfer to the balance sheet of the secondary lender in the form of a second amount due to the primary lender;

funding the second balance transfer by the computer of the primary lender;

summing up, by a third computer, one or more debits and one or more credits of the first and second posted balance transfers of the secondary lender; and settling, by the third computer, at least one amount due between the primary and secondary lenders based on at least in part on:
i) on the funding of first and second transactions of the first and the second customers respectively by the primary lender, and
ii) the posted first and second amounts due to the primary lender from the secondary lender, wherein the posted first and second amounts are based on funding of the first and second transactions of the first and the second customers respectively by the primary lender.

35. The method of claim 34, wherein the evaluation criteria of the secondary lender comprises at least one of: (1) credit risk; and (2) profitability.

36. The method of claim 34, wherein each of the declined first balance transfer request and the declined second balance transfer request is sent, by a computer, to the secondary lender from the primary lender.

37. The method of claim 34, further comprising receiving, by a computer, payment from each of the first and second customers.

38. The method of claim 37, wherein each received payment is owed to at least one of the primary and secondary lenders.

39. The method of claim 38, further comprising allocating, by a computer, each received payment between each of the primary and secondary lenders based on a payment hierarchy.

40. The method of claim 34, wherein at least one of the first and second transactions is carried out via use of a credit card account.

41. The method of claim 34, wherein at least one of the first and second transactions is carried out via use of a charge card account.

42. The method of claim 34, wherein at least one of the first and second transactions is carried out via use of an unsecured or secured credit account.

43. The method of claim 34, wherein at least one of the first and second transactions is carried out via use of a debit card account.

44. The method of claim 34, wherein the steps are carried out in the order recited.

\* \* \* \* \*